United States Patent [19]
Payne

[11] Patent Number: 5,499,578
[45] Date of Patent: Mar. 19, 1996

[54] SAUSAGE CUTTER

[76] Inventor: Patricia K. Payne, 702 Stony Creek, Sutton, W. Va. 26601

[21] Appl. No.: 393,199

[22] Filed: Feb. 23, 1995

[51] Int. Cl.⁶ .............................. A22C 9/00; A47J 43/00
[52] U.S. Cl. ................. 99/537; 30/114; 30/124; 83/597; 83/746; 83/762; 83/932; 99/430; 99/441; 452/30; 452/141; 452/148
[58] Field of Search .......................... 99/537, 538, 430, 99/439, 441, 509; 30/114, 124, 299, 303; 83/879, 597, 651.1, 762, 746, 932, 467.1; 269/295; 452/30, 141, 148; D7/673

[56] References Cited

U.S. PATENT DOCUMENTS

| | | | |
|---|---|---|---|
| 1,703,154 | 2/1929 | Lanzkron | 83/762 |
| 1,764,235 | 6/1930 | Wilmking | 83/762 |
| 2,243,137 | 5/1941 | Vaughan | 99/441 |
| 2,592,657 | 4/1952 | Cierley | 83/932 |
| 3,315,591 | 4/1967 | Elliott | 99/441 |
| 3,369,582 | 2/1968 | Giangiulio | 99/537 |
| 3,561,511 | 2/1971 | Kummer | 99/537 |
| 3,999,293 | 12/1976 | Zubrycki | 30/124 |
| 4,189,132 | 2/1980 | DiRusso | 269/295 |
| 4,708,044 | 11/1987 | Adams | 452/49 |
| 4,852,256 | 8/1989 | Schoettler | 99/537 |
| 4,976,029 | 12/1990 | Kennedy | 30/114 |

Primary Examiner—Timothy F. Simone

[57] ABSTRACT

A sausage cutter comprised of a cutting block having two portions. Each of the two portions has an upper surface, a lower surface, an inner surface, and an outer surface. The two portions are hingedly secured together at the lower surface thereof. Each inner surface has a longitudinally oriented concave recess formed therein. When the two portions are closed together each concave recess forms a containment chamber. Each of the two portions has a plurality of transversely oriented slots extending downwardly through the upper surface thereof to a position below the longitudinally oriented concave recess. The two portions serve to contain a sausage within the containment chamber formed by the longitudinally oriented concave recesses as the two portions are closed together.

2 Claims, 4 Drawing Sheets

SAUSAGE CUTTER

BACKGROUND OF THE INVENTION

1. Field of the Invention

The present invention relates to a sausage cutter and more particularly pertains to enabling the user to cut frozen sausage without the need to place fingers in the proximity of a cutting blade with a sausage cutter.

2. Description of the Prior Art

The use of food cutting devices is known in the prior art. More specifically, food cutting devices heretofore devised and utilized for the purpose of cutting food products are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,241,887 to Wolff et al. discloses a cutting device for cutting food products, in particular sausage, ham, bacon, meat, cheese, and such.

U.S. Pat. No. 4,708,044 to Adams discloses a knife assembly for cutting sausage casings.

U.S. Pat. No. 4,189,132 to Di Russo discloses a sausage cutting device.

U.S. Pat. No. 4,104,763 to Tetsuro discloses an apparatus for cutting a string of sausage links.

U.S. Pat. No. 4,060,875 to Gosling et al. discloses an apparatus for cutting stuffed sausage casing.

While these devices fulfill their respective, particular objective and requirements, the aforementioned patents do not describe a sausage cutter for enabling the user to cut frozen sausage without the need to place fingers in the proximity of a cutting blade.

In this respect, the sausage cutter according to the present invention substantially departs from the conventional concepts and designs of the prior art, and in doing so provides an apparatus primarily developed for the purpose of enabling the user to cut frozen sausage without the need to place fingers in the proximity of a cutting blade.

Therefore, it can be appreciated that there exists a continuing need for new and improved sausage cutter which can be used for enabling the user to cut frozen sausage without the need to place fingers in the proximity of a cutting blade. In this regard, the present invention substantially fulfills this need.

SUMMARY OF THE INVENTION

In the view of the foregoing disadvantages inherent in the known types of food cutting devices now present in the prior art, the present invention provides an improved sausage cutter. As such, the general purpose of the present invention, which will be described subsequently in greater detail, is to provide a new and improved sausage cutter and method which has all the advantages of the prior art and none of the disadvantages.

To attain this, the present invention essentially comprises a cutting block comprised of two portions. Each of the two portions has an upper surface, a lower surface, an inner surface, and an outer surface. The two portions are hingedly secured together at the lower surface thereof. Each inner surface has a longitudinally oriented concave recess formed therein. When the two portions are closed together each concave recess forms a containment chamber. Each lower surface has a recess formed therein at opposing ends thereof. Each of the two portions has a plurality of transversely oriented slots extending downwardly through the upper surface thereof to a position below the longitudinally oriented concave recess. The two portions serve to contain a sausage within the containment chamber formed by the longitudinally oriented concave recesses as the two portions are closed together. The device contains four small legs. Each of the small legs has a first end and a second end. Each first end is dimensioned to be received within the recesses formed in the lower surface of the two portions of the cutting block. Each second end has a non-skid rubber surface thereon.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved sausage cutter which has all the advantages of the prior art food cutting devices and none of the disadvantages.

It is another object of the present invention to provide a new and improved sausage cutter which may be easily and efficiently manufactured and marketed.

It is a further object of the present invention to provide a new and improved sausage cutter which is of durable and reliable construction.

An even further object of the present invention is to provide a new and improved sausage cutter which is susceptible of a low cost of manufacture with regard to both materials and labor, and which accordingly is then susceptible of low prices of sale to the consuming public, thereby making such a sausage cutter economically available to the buying public.

Still yet another object of the present invention is to provide a new and improved sausage cutter which provides in the apparatuses and methods of the prior art some of the advantages thereof, while simultaneously overcoming some of the disadvantages normally associated therewith.

Even still another object of the present invention is to provide a new and improved sausage cutter for enabling the user to cut frozen sausage without the need to place fingers in the proximity of a cutting blade.

Lastly, it is an object of the present invention to provide a new and improved sausage cutter comprised of a cutting block having two portions. Each of the two portions has an upper surface, a lower surface, an inner surface, and an outer surface. The two portions are hingedly secured together at the lower surface thereof. Each inner surface has a longitudinally oriented concave recess formed therein. When the two portions are closed together each concave recess forms a containment chamber. Each of the two portions has a plurality of transversely oriented slots extending downwardly through the upper surface thereof to a position below the longitudinally oriented concave recess. The two portions serve to contain a sausage within the containment chamber formed by the longitudinally oriented concave recesses as the two portions are closed together.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
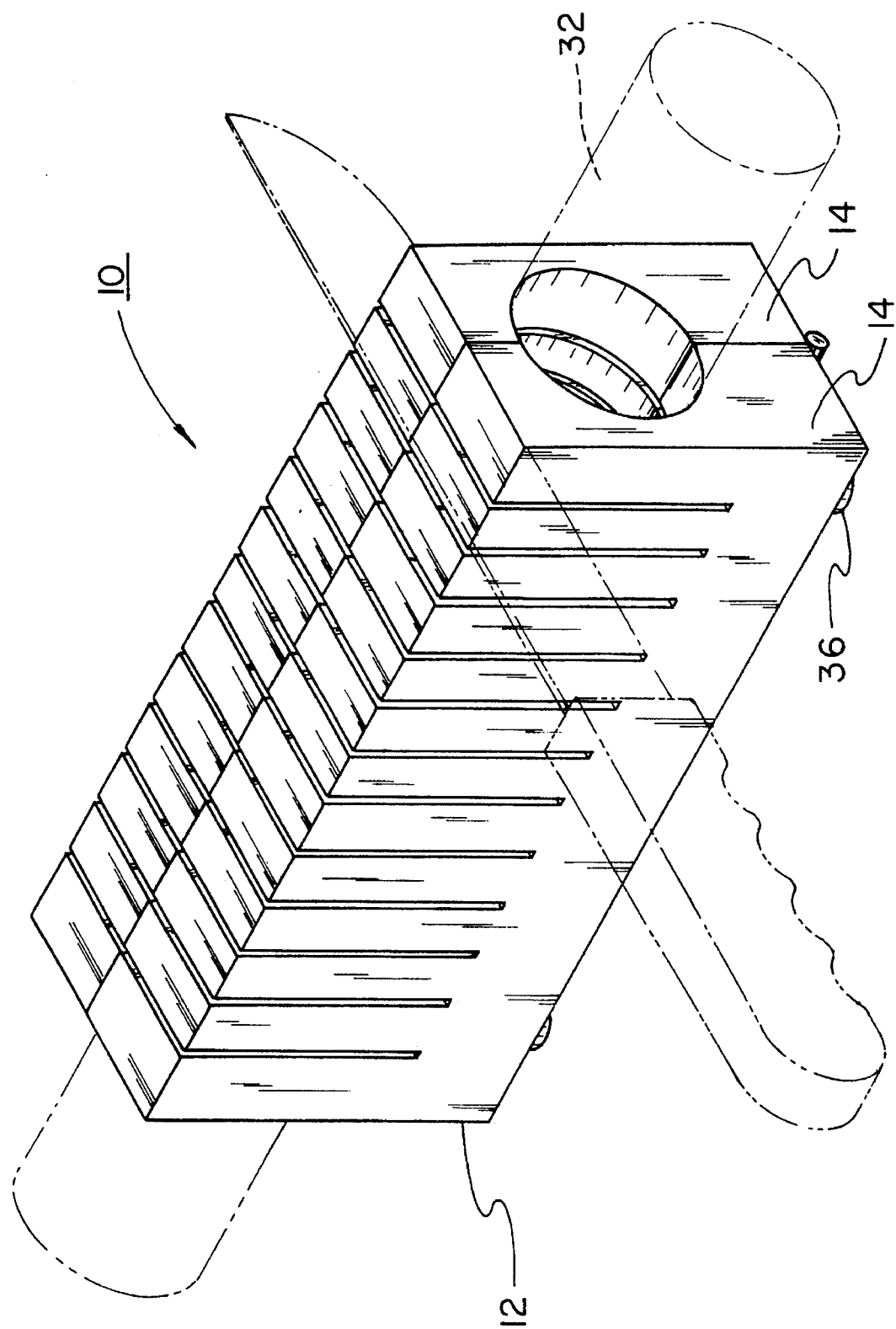
FIG. 1 is a perspective view of the preferred embodiment of the sausage cutter constructed in accordance with the principles of the present invention.
Figure 2:
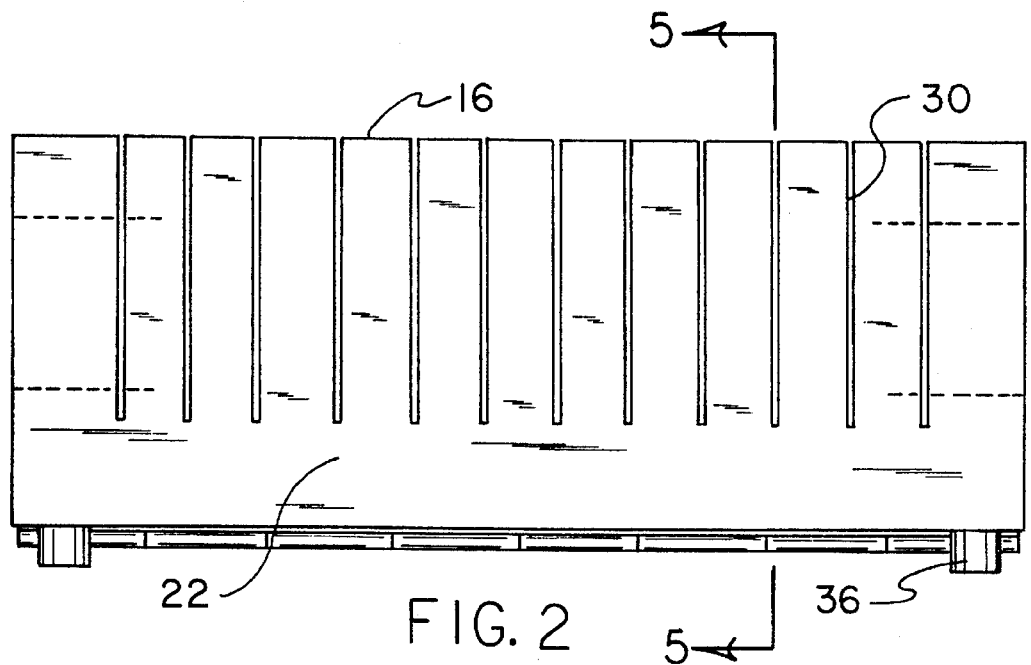
FIG. 2 is a side elevation view of the present invention.
Figure 3:
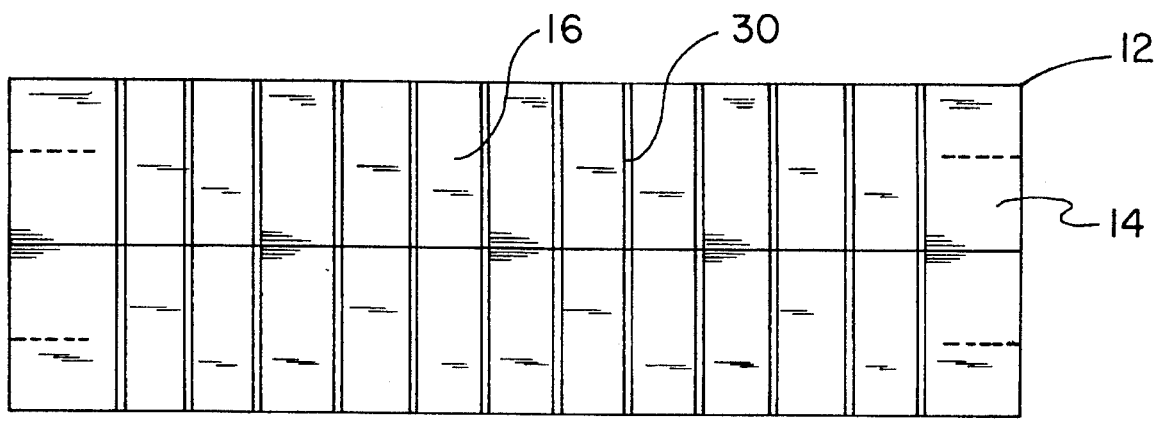
FIG. 3 is a plan view of the preferred embodiment of the present invention.
Figure 4:
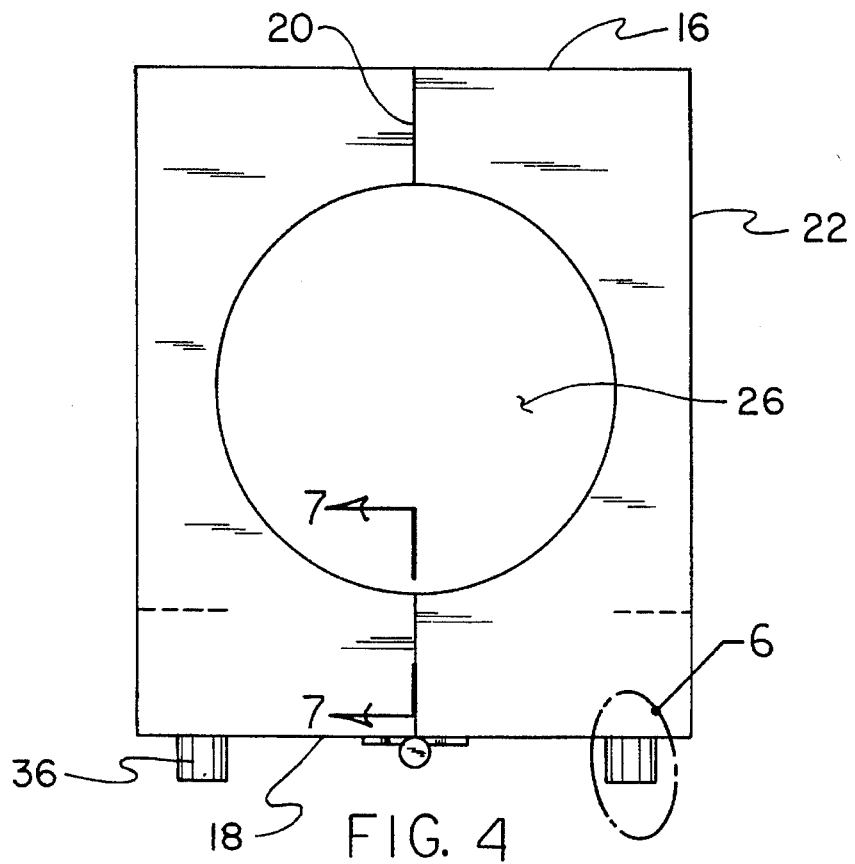
FIG. 4 is a front elevation view of the present invention.
Figure 5:
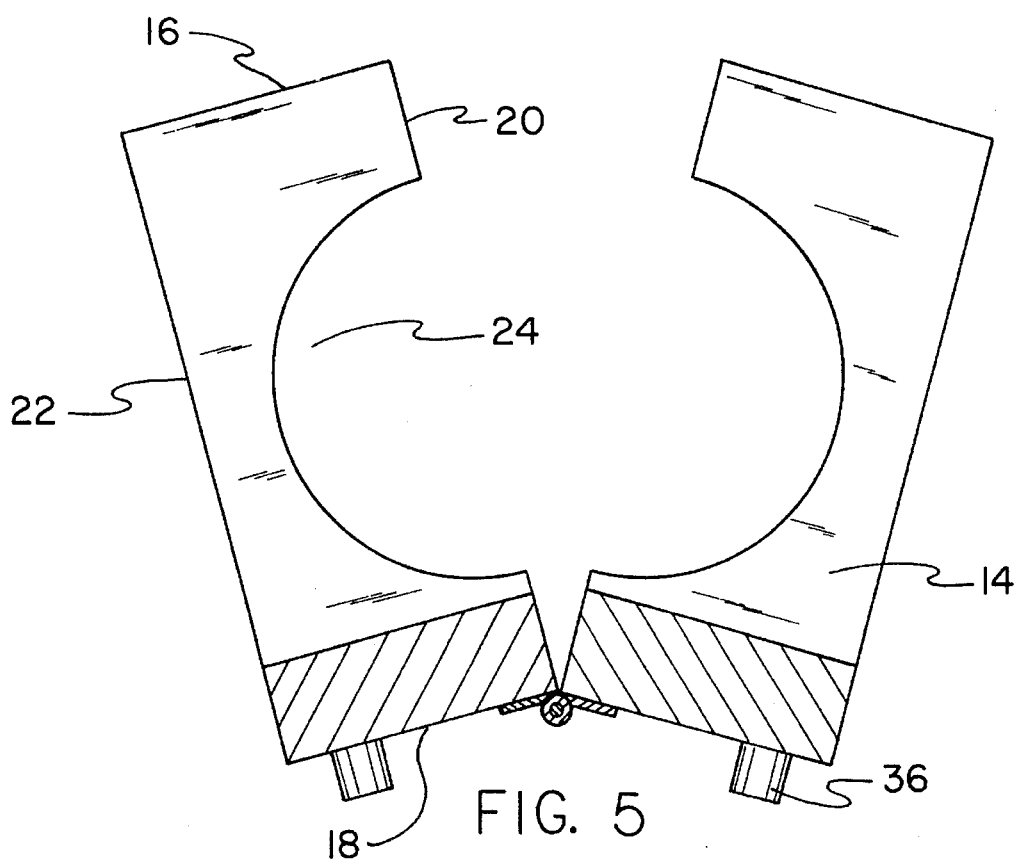
FIG. 5 is a cross-sectional view as taken along line 5—5 of FIG. 2.
Figure 6:
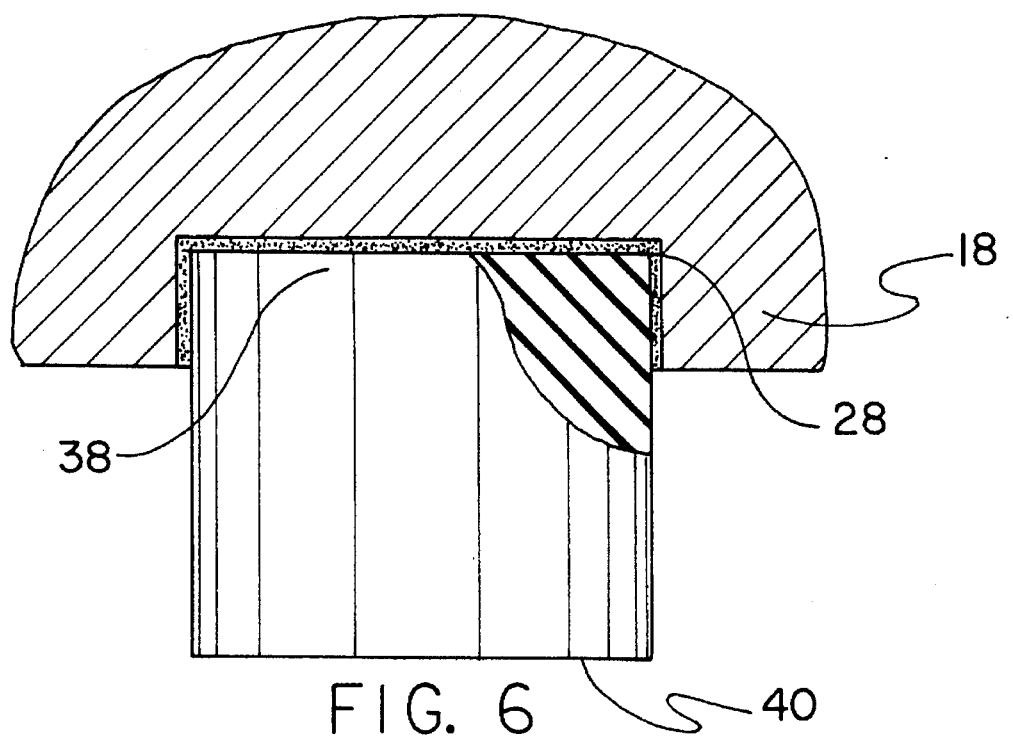
FIG. 6 is an enlarged fragmentary view of the legs of the present invention taken from FIG. 4.
Figure 7:
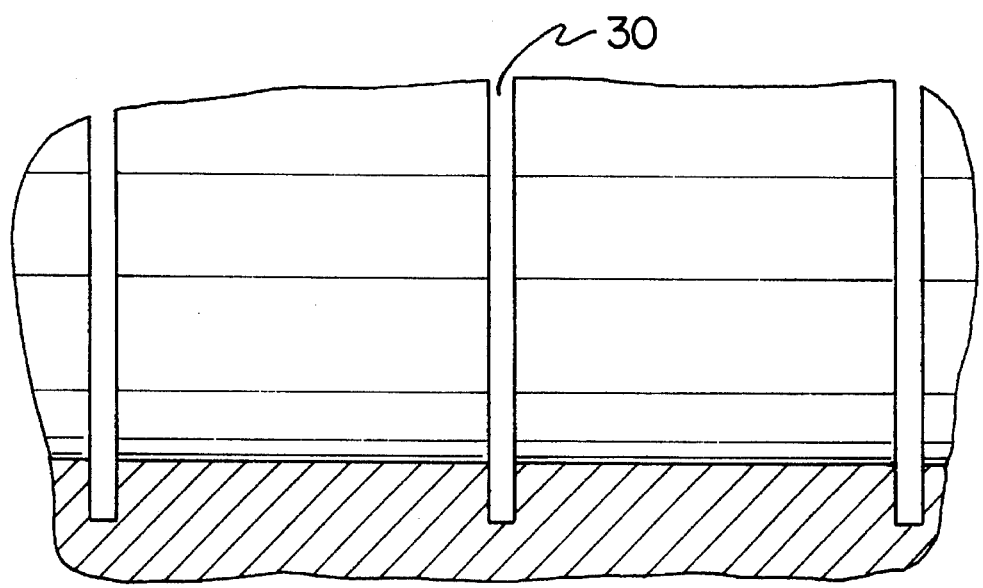
FIG. 7 is a cross-sectional view as taken along line 7—7 of FIG. 4.

With reference now to the drawings, and in particular, to FIG. 1 thereof, the preferred embodiment of the new and improved sausage cutter embodying the principles and concepts of the present invention and generally designated by the reference number 10 will be described.

Specifically, it will be noted in the various Figures that the device relates to a new and improved sausage cutter for enabling the user to cut frozen sausage without the need to place fingers in the proximity of a cutting blade. In its broadest context, the device consists of a cutting block and four small legs.

The device 10 contains a cutting block 12 comprised of two portions 14. Each of the two portions 14 has an upper surface 16, a lower surface 18, an inner surface 20, and an outer surface 22. The two portions 14 are hingedly secured together at the lower surface 18 thereof. Each inner surface 20 has a longitudinally oriented concave recess 24 formed therein. When the two portions 14 are closed together each concave recess 24 forms a containment chamber 26. Each lower surface 18 has a recess 28 formed therein at opposing ends thereof. Each of the two portions 14 has a plurality of transversely oriented slots 30 extending downwardly through the upper surface 16 thereof to a position below the longitudinally oriented concave recess 24. The slots 30 should be large enough to allow a butcher knife or the like to easily passed through. The slots 30 should also be evenly spaced. The two portions 14 serve to contain a sausage 32 within the containment chamber 26 formed by the longitudinally oriented concave recesses 24 as the two portions 14 are closed together. This will allow for the sausage 32 to be sliced up by the butcher knife through the slots 30. When the two portions 14 are closed together, the resulting geometric shape is generally rectangular with the height and width in a close to 3:4 ratio. The slots 30 extend down about ¾ of the height of the two portions 14.

The device 10 contains four small legs 36. Each of the small legs 36 has a first end 38 and a second end 40. Each first end 38 is dimensioned to be received within the recesses 28 formed in the lower surface 18 of the two portions 14 of the cutting block 12. Each second end 40 has a non-skid rubber surface thereon. The small legs 36 can incorporated as a permanent feature of the device 10, or they could be made to be removable.

The present invention is a device 10 designed to enable the user to cut frozen sausage 32 without the need to place fingers in the proximity of a cutting blade.

It is simply comprised of a cutting board 12 and a retaining nest which also serves as a cutting guide. The cutting board 12 has four short legs 36 which extent angularly from its base, and each of these legs 36 is capped with a non-skid rubber tip. The retaining nest is hinge mounted at one end of the board 12 and features a longitudinally oriented concave recess 24 along its inner surface 20. This member also has a series of transversely oriented slots 30 which are just slightly wider than the blade thickness of a knife.

From the foregoing description, the use of this handy and functional implement becomes fairly obvious. One need only lay the sausage on the board 12 and rotate the nest/cutting guide downward to abut the sausage. The sausage will thus be firmly entrapped, and it is a simple matter to run the knife through each of the slots 30 in turn while the other hand holds the nest at its far end—well away from the knife blade.

The idea is simple but very effective. Frozen sausage can be very elusive, and the holding hand must typically be placed close to the area being cut. Hence, one will be obligated to "chase" the sausage across the counter top and can sustain a nasty cut in the process. This cutting block 12 addresses and eliminates these problems. It is indeed the type of product which should be appreciated by good cooks everywhere.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A sausage cutter for enabling the user to cut frozen sausage without the need to place fingers in the proximity of a cutting blade comprising, in combination:

a cutting block comprising two portions, each of the two portions having an upper surface, a lower surface, an inner surface, and an outer surface, the two portions hingedly secured together at the lower surface thereof, each inner surface having a longitudinally oriented concave recess formed therein, when the two portions are closed together each concave recess forms a containment chamber, each lower surface having a recess formed therein at opposing ends thereof, each of the two portions having a plurality of transversely oriented slots extending downwardly through the upper surface thereof to a position below the longitudinally oriented concave recess, the two portions serving to contain a sausage within the containment chamber formed by the longitudinally oriented concave recesses as the two portions are closed together;

four small legs, each of the small legs having a first end and a second end, each first end dimensioned to be received within the recesses formed in the lower surface of the two portions of the cutting block, each second end having a non-skid rubber surface thereon.

2. A sausage cutter for enabling the user to cut frozen sausage without the need to place fingers in the proximity of a cutting blade comprising, in combination:

a cutting block comprising two portions, each of the two portions having an upper surface, a lower surface, an inner surface, and an outer surface, the two portions hingedly secured together at the lower surface thereof, each inner surface having a longitudinally oriented concave recess formed therein, when the two portions are closed together each concave recess forms a containment chamber, each of the two portions having a plurality of transversely oriented slots extending downwardly through the upper surface thereof to a position below the longitudinally oriented concave recess, the two portions serving to contain a sausage within the containment chamber formed by the longitudinally oriented concave recesses as the two portions are closed together; and the cutter including four small legs, each of the small legs having a first end and a second end, each first end secured to the lower surface of the two portions of the cutting block, each second end having a non-skid rubber surface thereon.

* * * * *